(12) United States Patent
Lammers et al.

(10) Patent No.: US 9,988,574 B2
(45) Date of Patent: Jun. 5, 2018

(54) STABILIZATION OF AN AQUEOUS SOLUTION OF AN ORGANIC IRON SALT

(71) Applicant: AKZO NOBEL CHEMICALS INTERNATIONAL B.V., Amersfoort (NL)

(72) Inventors: Hans Lammers, Arnhem (NL); Johannes Albertus Maria Meijer, Schalkhaar (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 525 days.

(21) Appl. No.: 14/387,501

(22) PCT Filed: Mar. 27, 2013

(86) PCT No.: PCT/EP2013/056459
§ 371 (c)(1),
(2) Date: Sep. 23, 2014

(87) PCT Pub. No.: WO2013/144175
PCT Pub. Date: Oct. 3, 2013

(65) Prior Publication Data
US 2015/0075999 A1 Mar. 19, 2015

Related U.S. Application Data

(60) Provisional application No. 61/619,997, filed on Apr. 4, 2012, provisional application No. 61/620,033, filed on Apr. 4, 2012.

(30) Foreign Application Priority Data

Mar. 30, 2012 (EP) .................................... 12162533
Mar. 30, 2012 (EP) .................................... 12162544

(51) Int. Cl.
*C25B 1/00* (2006.01)
*C09K 15/06* (2006.01)
(Continued)

(52) U.S. Cl.
CPC ................ *C09K 15/06* (2013.01); *C01D 3/26* (2013.01); *C25B 1/00* (2013.01); *C25B 3/02* (2013.01); *C25B 9/08* (2013.01)

(58) Field of Classification Search
CPC .. C09K 15/06; C25B 9/08; C25B 3/02; C25B 1/00; C01D 3/26
See application file for complete search history.

(56) References Cited

U.S. PATENT DOCUMENTS 3,425,920 A 2/1969 Frantzis
4,113,588 A 9/1978 Watanabe et al.
(Continued)

FOREIGN PATENT DOCUMENTS

DE 198 50 530 5/2000
EP 0 517 234 3/1997
(Continued)

OTHER PUBLICATIONS

Bisang, J.M., "Electrochemical treatment of waste solutions containing ferrous sulfate by anodic oxidation using an undivided reactor", Journal of Applied Electrochemistry, (2000), vol. 30, pp. 399-404.
(Continued)

*Primary Examiner* — Arun S Phasge
(74) *Attorney, Agent, or Firm* — McDonnell Boehnen Hulbert & Berghoff LLP

(57) ABSTRACT

Process and station for stabilizing an aqueous solution of an iron salt of an organic acid with a ferric component and a ferrous component of less solubility than the ferric component, such as the aqueous solution based on the $Fe^{3+}$ salt of (Continued)

Figure 1:
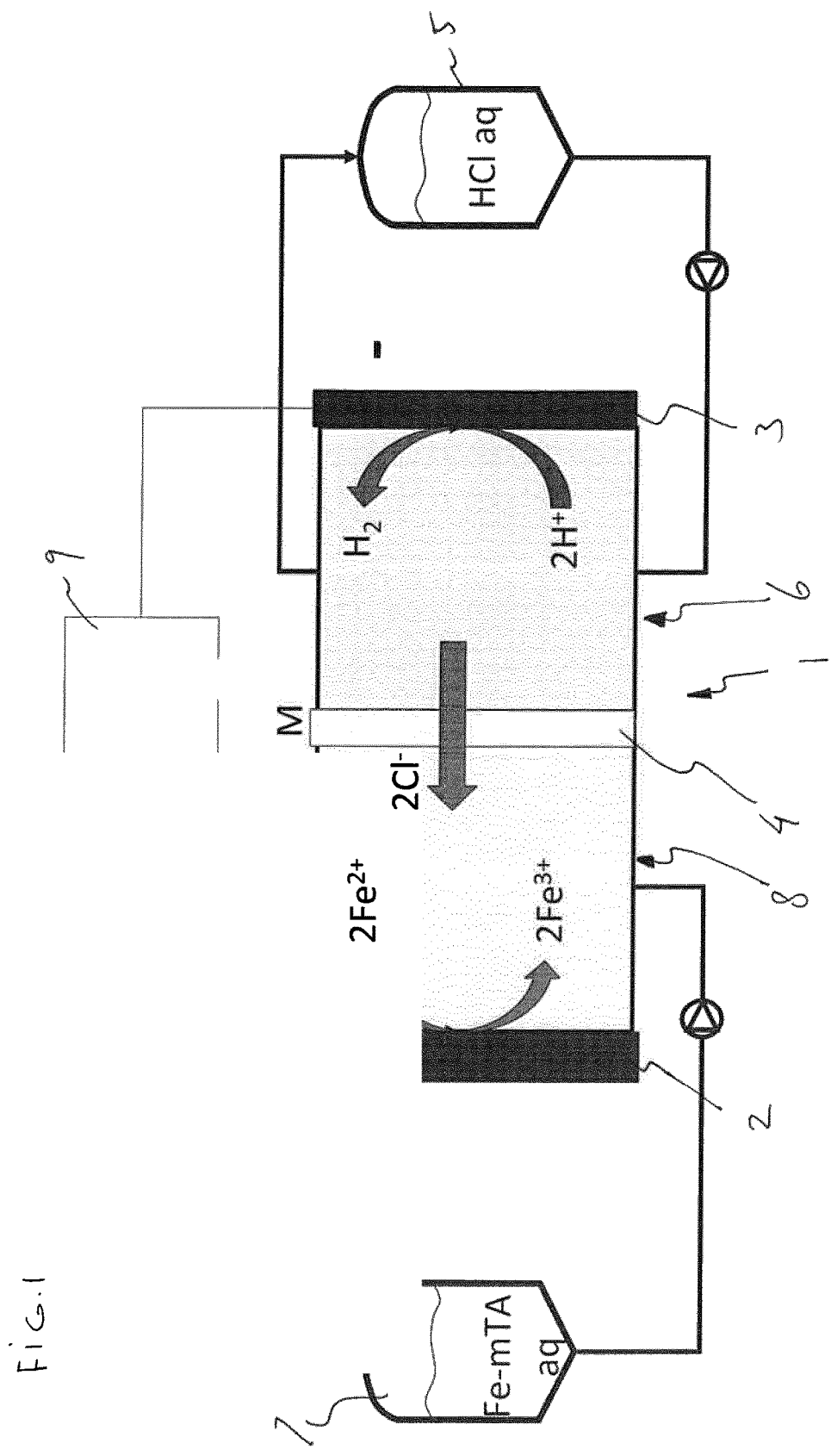

meso-tartaric acid. To stabilize the content of the dissolved ferric salt, the solution is at least partly subjected to electrolytic oxidation.

20 Claims, 4 Drawing Sheets

(51) Int. Cl.
  *C01D 3/26* (2006.01)
  *C25B 3/02* (2006.01)
  *C25B 9/08* (2006.01)

(56) References Cited

U.S. PATENT DOCUMENTS

| | | | |
|---|---|---|---|
| 4,126,529 A * | 11/1978 | DeBerry | B01D 53/60 204/526 |
| 4,150,241 A | 4/1979 | Prescher et al. | |
| 5,595,645 A * | 1/1997 | Barr | C25B 1/00 205/509 |
| 6,800,263 B1 | 10/2004 | Boon | |
| 6,910,954 B2 | 6/2005 | Kim et al. | |
| 2010/0056732 A1 | 3/2010 | McElvain et al. | |
| 2010/0059388 A1* | 3/2010 | Clarke | H01M 8/0612 205/343 |
| 2012/0129952 A1 | 5/2012 | Bakkenes et al. | |

FOREIGN PATENT DOCUMENTS

| | | |
|---|---|---|
| GB | 2 206 624 | 1/1989 |
| JP | 61-104092 | 5/1986 |
| WO | 2000/059828 | 10/2000 |
| WO | 01/25365 | 4/2001 |
| WO | 02/081600 | 10/2002 |
| WO | 2006/048407 | 5/2006 |
| WO | 2007/062650 | 6/2007 |
| WO | 2007/065228 | 6/2007 |
| WO | 2010/002657 | 1/2010 |
| WO | 2010/139587 | 12/2010 |
| WO | 2011/073017 | 6/2011 |
| WO | 2013/083503 | 6/2013 |

OTHER PUBLICATIONS

WEB Program, ISIC 18, 18th International Symposium on Industrial Crystallization, updated Sep. 9, 2011, Bode, A.A.C. et al., "Anti-caking agents for sodium chloride as a crystal growth inhibitor: Interactions studied using various techniques," 19 pages.
Gomathi, H., "Chemistry and Electrochemistry of Iron Complexes", Bulletin of Electrochemistry, Oct. 2000, 16 (10), pp. 459-465.
Lee, J. et al., "Electrogenerative oxidation of ferrous ions with graphite electrodes", Journal of Applied Electrochemistry, 1993, vol. 23, pp. 745-752.
Li, Dai-Xi et al, "catena-Poly[[[diaquacobalt(II)-µ-tartrato-K4O,O':O'',O'''] monohydrate]", Metal-organic papers, Acta Cryst (2004), pp. m1982-m1984.
Marconi, P.F. et al., "Recovery of pickling effluents by electrochemical oxidation of ferrous to ferric chloride", Journal of Applied Electrochemistry, (1996), vol. 26, pp. 693-701.
Ramamoorthy, S. et al., "Equilibrium studies of metal-ion complexes of interest to natural waters-I", J. Inorg. Nucl. Chem., 1972, vol. 34, pp. 1977-1987.
Sagortschew, B. "Separation of Ferrous and Ferric Ions by Ion Exchange", Chemia Analityczna, 1972, vol. 17, pp. 973-978 (with English language summary).
Santana-Casiano, J. Magdalena et al. "Oxidation of Nanomolar Levels of Fe(II) with Oxygen in Natural Waters", Environmental Science & Technology, 2005, vol. 39, pp. 2073-2079.
Best Available Techniques (BAT) Reference Document for the Production of Chlor-alkali, European Comission Joint Research Centre, Dec. 2011, 342 pages.
European Search Report for EP Application No. 12162544 dated Aug. 27, 2012.
International Search Report for Application No. PCT/EP2013/056458, dated Sep. 18, 2013.
European Search Report for EP Application No. 12162533.9, dated Sep. 7, 2012.
International Search Report for Application No. PCT/EP2013/056459, dated Jul. 31, 2013.
John D. Hem "Complexes of Ferrous Iron with Tannic Acid". Geological Survey Water-Supply Paper 1459-D, p. 75-94 (1960).

* cited by examiner

STABILIZATION OF AN AQUEOUS SOLUTION OF AN ORGANIC IRON SALT

REFERENCE TO RELATED APPLICATIONS

This application is the U.S. National Phase of PCT/EP2013/056459, filed on Mar. 27, 2013, and claims the benefit of EP Application No. 12162533.9, filed on Mar. 30, 2012, EP Application No. 12162544.6, filed on Mar. 30, 2012, U.S. Provisional Application No. 61/619,997, filed on Apr. 4, 2012, and U.S. Provisional Application No. 61/620,033, filed on Apr. 4, 2012.

The present invention pertains to a method for stabilizing an aqueous solution of an iron salt of an organic acid with a ferric component and a ferrous component of less solubility than the ferric component, in particular iron salt based on meso-tartaric acid (FeMTA), which can for instance be used as a non-caking agent for salt, in particular sodium chloride. The invention also pertains to a station for preparing and stabilizing such an aqueous solution.

Sodium chloride tends to form large, agglomerated masses upon exposure to moisture, particularly during long periods of storage. These hardened masses are generally referred to as cakes. A non-caking agent is generally added to the sodium chloride to prevent caking. Classic non-caking agents include sodium ferrocyanide and potassium ferrocyanide. Because of the nitrogen content and because of the produced iron traces in the treated brines, it has been proposed to replace these non-caking agents with an iron salt of a hydroxypolycarboxylic acid, preferably being a mixture of tartaric acids comprising meso-tartaric acid (see WO 2000/059828, an iron salt of a mixture of tartaric acids comprising meso-tartaric acid is hereinafter also referred to as "a non-caking agent based on the $Fe^{3+}$ salt of meso-tartaric acid" or "a non-caking agent comprising the $Fe^{3+}$ salt of meso-tartaric acid"). The $Fe^{3+}$ salt of meso-tartaric acid is hereinafter denoted as FeMTA. WO 2010/139587 discloses a non-caking agent based on the $Fe^{3+}$ salt of meso-tartaric acid.

Non-caking agents for sodium chloride, also denoted hereinafter as "salt", are typically dissolved in water and stored as aqueous solutions before these are dispensed into an amount of salt. For instance, non-caking agents based on FeMTA are typically supplied as aqueous concentrates with a Fe concentration of, e.g., about 3.7 wt %. The non-caking solution is subsequently prepared for use by dilution with water. When the non-caking agent is dosed onto the salt, the Fe concentration is typically below about 3 wt. %, e.g., within the range of 1.5 to 2.5 wt. %, e.g., about 2.1 wt. %, based on the total weight of the solution. Other concentrations can also be used, if so desired.

After a solution with a desired concentration and a desired pH is obtained, the aqueous solution is metered and sprayed or poured over the salt. Suitable set values for the pH of a non-caking aqueous solution based on FeMTA are for instance between 3 and 5, e.g., between 4 and 4.5. The pH can for instance be adjusted as known in the art, but preferably by adding a solution of tartaric acid and/or hydrochloric acid. If the pH is below 3, the pH value is preferably adjusted by adding an aqueous solution of sodium hydroxide.

After production of an aqueous solution of a non-caking agent based on FeMTA, or preferably of FeMTA, typically about 1-3 wt. %, sometimes 2-3 wt. %, of the iron content of the solution is $Fe^{2+}$, the remainder being $Fe^{3+}$. The $Fe^{2+}$ tends to precipitate as Fe(II)mesotartrate (hereinafter also denoted as the Fe(II) complex of mesotartaric acid or the Fe(II) salt of mesotartaric acid) because of its low solubility. This removes $Fe^{2+}$ from the solution, which is balanced by the reduction of $Fe^{3+}$ to fresh $Fe^{2+}$. Consequently some tartaric acid is oxidized to oxalic acid and other degradation products like $CO_2$. This slow degradation process reduces the concentration of dissolved FeMTA over time and, consequently, the effectiveness of the solution as a non-caking agent.

It is an object of the invention to provide a method and a station for preparing an aqueous solution with a stabilized dissolved content over a longer period of time.

FIG. 1 shows schematically an electrolyte cell for use with the present invention.

Figure 2:
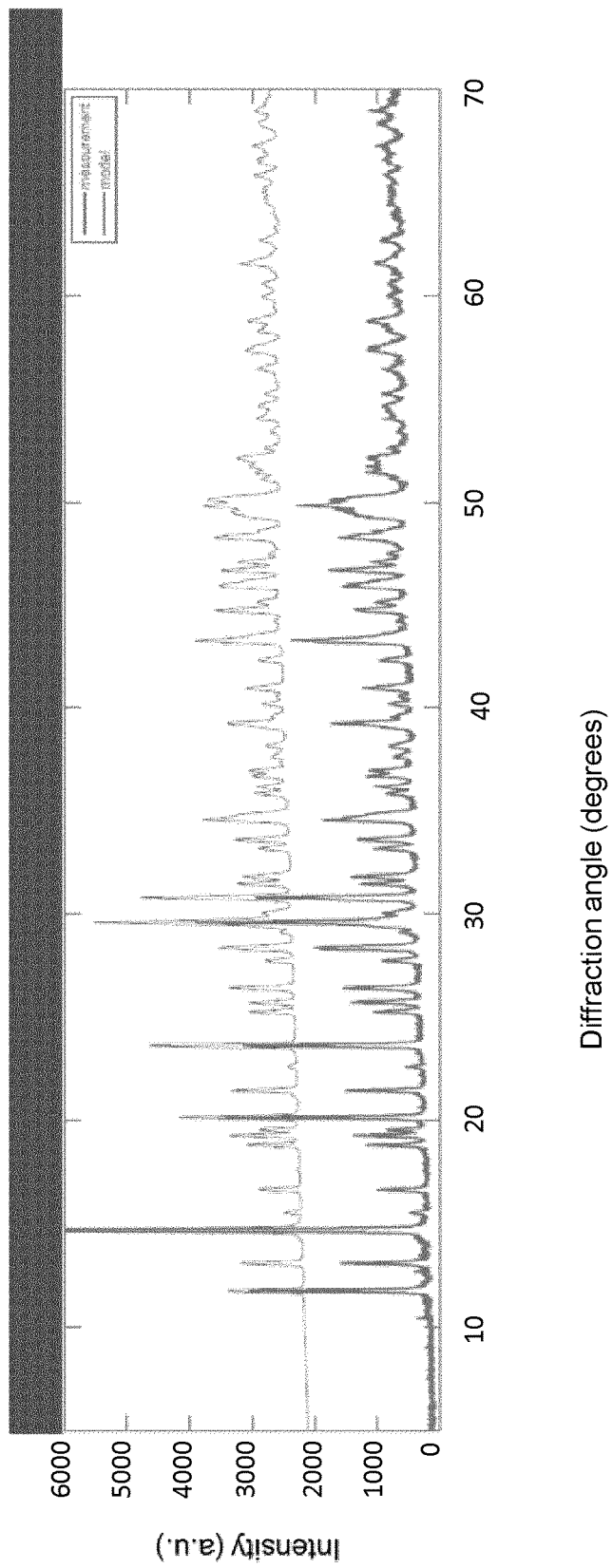

FIG. 2 displays a diffractogram of the sample in Example 2 together with the model fit.

Figure 3:
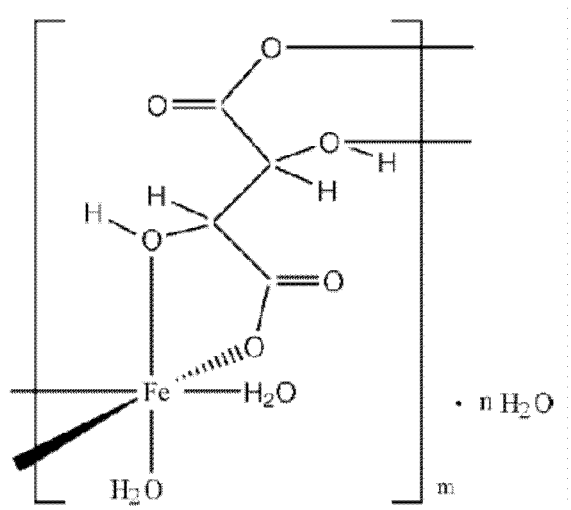

FIG. 3 displays a representation of the structure of the {[Fe(C4H4O6)(H2O)2](H2O)n}m complex.

Figure 4:
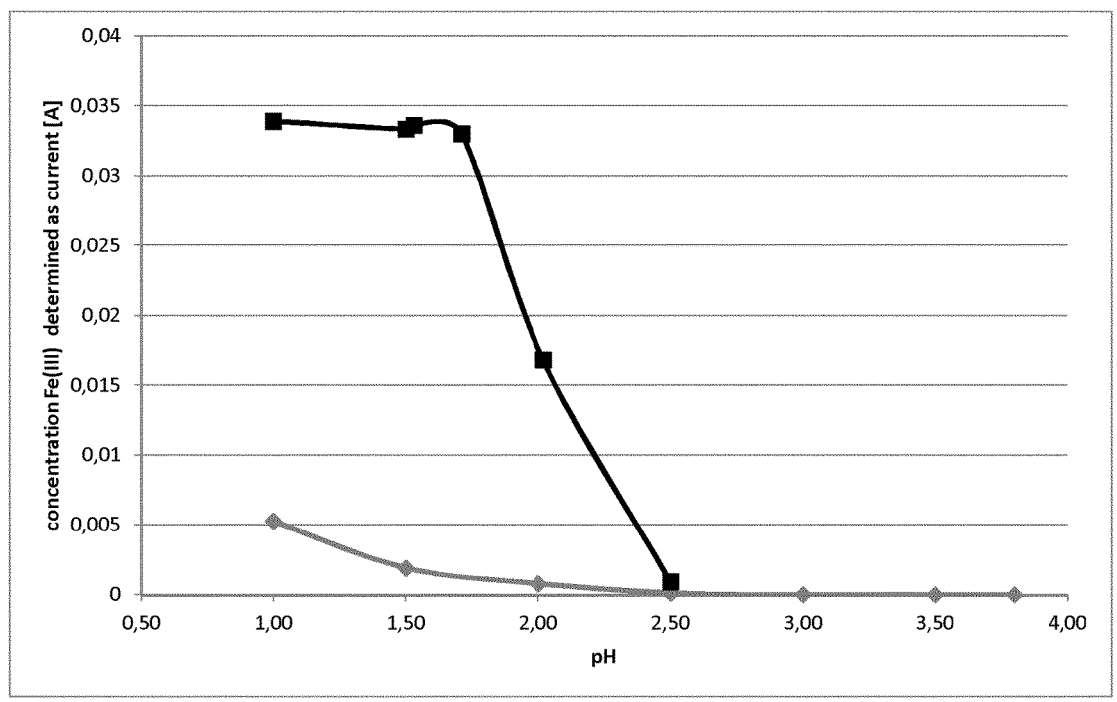

FIG. 4 shows the influence of the pH on the free Fe(lll) concentration discussed in Example 3.

The object of the invention is achieved with a process for stabilizing an aqueous solution of an iron salt of an organic acid with a ferric component and a ferrous component of less solubility than the ferric component, in particular an aqueous solution based on FeMTA, and preferably an aqueous solution of FeMTA, the aqueous solution is at least partly subjected to electrolytic oxidation.

It is noted that stabilizing according to the invention means maintaining the effectiveness (functionality) of a solution of an iron salt of an organic acid as a non-caking agent by keeping said iron salt in solution. The iron salt of an organic acid is kept in solution according to this invention by reducing the amount of the ferrous component of less solubility by way of at least partly subjecting the solution to electrolytic oxidation.

More particularly, $Fe^{2+}$ ions in an aqueous solution of non-caking agent according to the present invention, viz. an iron salt of an organic acid with a ferric component and a ferrous component of less solubility than the ferric component, are at least partly oxidized to form $Fe^{3+}$. Precipitation of the Fe(II) salt of the organic acid is thus at least partly prevented and in this way the Fe(III) salt of the organic acid is effectively stabilized.

In the preferred embodiment, this means that $Fe^{2+}$ ions in the FeMTA solution are at least partly oxidized to form $Fe^{3+}$ and precipitation of Fe(II)mesotartrate complex is prevented at least to a large extent. This way the FeMTA concentration can effectively be stabilized.

EP 0 517 234 relates to a method of regenerating an aluminium surface cleaning agent which is used in an aluminium surface cleaning bath. This method comprises the following steps: (a) supplying the cleaning agent to the anode chamber of an electrolytic tank being separated into an anode chamber and cathode chamber by a partition, said cleaning agent including ferrous ions reduced during the cleaning of the aluminium surface, (b) oxidizing the ferrous ions electrolytically into ferric ions, and (c) returning the cleaning agent containing the ferric ions to the cleaning bath from the electrolytic tank, wherein the cleaning agent is regulated to have a pH value of 0.6-2.0, wherein sulfuric acid, optionally together with nitric acid, is added to the cathode chamber of said electrolytic tank to regulate the pH value thereof, further including the step of replenishing iron ions by supplying ferric sulfate so as to replenish ferric ions and sulfuric ions. Tartaric acid may be present in the cleaning solution. The aim here is to replenish an electron acceptor by way of electrolysis. This document does not disclose maintaining a solubility balance of a non-caking agent to keep said agent in solution over a longer period of time by using an electrolytic cell to oxidize $Fe^{2+}$. On the contrary, it discloses that a balance needs to be maintained as too many ferric ions will adversely affect the etching rate and in the case of a very small amount of ferric ions, the etching process will be too slow to clean the surface satisfactorily.

The oxidation step according to the present invention can, e.g., be carried out in a circulation loop and/or in a batch of a prepared aqueous non-caking solution according to the present invention, preferably being a FeMTA based aqueous solution, and most preferably being a FeMTA solution. It can also be carried out in a dosing station where the prepared solution is metered and dispensed by spraying or pouring it over an amount of salt.

The electrolytic oxidation step can be carried out in one or more electrolytic cells comprising an anode and a cathode in an electrolyte, optionally separated by a separator. Oxidation of $Fe^{2+}$ to $Fe^{3+}$ takes place at the anode. To this end the aqueous non-caking agent solution according to the present invention, preferably the FeMTA based aqueous solution and most preferably the FeMTA solution, is passed along the anode in order to provide transport of $Fe^{2+}$ towards the anode surface where it can be oxidized into $Fe^{3+}$ under the influence of an electric potential.

The anode can be made of a suitable material that allows selective oxidation of $Fe^{2+}$ without the oxidation of other species present in the aqueous mixture, preferably being the FeMTA mixture, and that does not oxidize under the process conditions. Suitable materials include, e.g., platinum, platinized titanium, carbon or $RuO_2/IrO_2$ coated titanium (DSA®) or any other stable electrode material.

At the cathode a reduction reaction takes place consuming electrons released at the anode. Suitable reduction reactions include, e.g., water reduction to produce hydrogen and hydroxyl ions or the reduction of protons to hydrogen.

Any other reaction can also be applied as long as the products are compatible with the electrode fluid and do not cause deactivation of the electrode.

The electrodes can be flat plates, gauze, wires or made of a suitable porous material such as foam, felt or a bed of particles.

To reduce the risk of reduction of $Fe^{3+}$ to $Fe^{2+}$ at the cathode a separator can be disposed between the anode and the cathode. The separator can be for example a porous or non-porous separator. Porous separators can be a porous diaphragm, for instance porous glass (e.g., sintered glass), porous polymeric or ceramic membranes or a non-woven porous material. Non-porous separators can for example be membranes, e.g., ion exchange membranes such as anion exchange membranes or cation exchange membranes. Alternatively, the electrolytic oxidation can take place in an electrolytic cell without a separator between the anode and the cathode.

The electrolytic cell can for instance comprise a catholyte of 1-3 M HCl aqueous solution, although higher or lower HCl concentrations can also be used if so desired. Depending on the electrochemical cell configuration and the optionally applied separator, alternative catholytes can also be used, such as aqueous solutions of salts, such as sodium chloride, sodium sulfate or any other suitable electrolyte.

If an electrolytic cell is used without a separator, reduction of $Fe^{3+}$ at the cathode can for example be achieved by using a cathode with an electrode surface area which is smaller than the electrode surface area of the anode. The cathode surface area can for instance be less than 50%, e.g. less than 20%, e.g. less than 2% of the anode electrode surface area.

Alternatively, or additionally, a cathode can be used of a material which is more selective towards reactions other than $Fe^{3+}$ reduction, for example a platinum-containing cathode material which is more selective to the reduction of $H^+$ to $H_2$. A further possible way to minimize reduction of $Fe^{3+}$ at the cathode is to control flow conditions in such a way that only a small part of the aqueous solution of non-caking agent according to present invention and preferably the FeMTA solution is subjected to cathodic reduction.

The aqueous solution of non-caking agent according to the present invention, preferably a non-caking agent solution based on FeMTA, and more preferably a FeMTA solution, can for example be circulated along the anode of one or more of the at least one electrolytic cells, e.g., via a loop operatively connected to a discharge for discharging the solution based on FeMTA, or preferably the FeMTA solution, e.g., to a dispensing station, and a supply for supplying fresh solution based on FeMTA, or preferably fresh FeMTA solution.

Although the aqueous solutions based on FeMTA may in practice for example have an iron content below 5 wt. % by weight of the total solution, it has been found that the FeMTA concentration can effectively be stabilized by subjecting the FeMTA based solution to an electrolytic oxidation step maintaining the $Fe^{2+}$ content below, e.g., 3 wt. % by weight of the total iron content.

Preferably, at least 50 wt. %, e.g., at least 80 wt. % or at least 95 wt. % of the $Fe^{2+}$ in the solution is oxidized to $Fe^{3+}$.

Typically, the aqueous solution based on FeMTA which is subjected to the electrolytic oxidation step according to the present invention comprises at least 0.0001 wt % of iron (i.e. the amount of $Fe^{2+}$ and $Fe^{3+}$ together) based on the total weight of said solution. It typically comprises at most 20 wt % of iron, preferably at most 10 wt % of iron, and most preferably at most 5 wt % of iron, based on the total weight of said solution.

The electric potential to be used in the electrolytic cell can be fine-tuned by routine optimization to maximize $Fe^{2+}$ oxidation and to reduce the production of by-products.

The invention also relates to a station for preparing an aqueous solution of a non-caking agent according to the present invention, viz. an iron salt of an organic acid with a ferric component and a ferrous component of less solubility than the ferric component, preferably an aqueous solution comprising FeMTA, and most preferably an aqueous solution of FeMTA, said station comprising a circulation loop and/or a reservoir containing the solution, wherein the circulation loop and/or the reservoir comprise at least one electrolytic cell, as disclosed above.

If the electrolytic cell comprises a separator between the anode and the cathode, the anolyte space between the anode and the separator of the one or more electrolytic cells can for example be part of a circulation loop. The anode can for instance be made of a porous structure that is part of the circulation loop through which the anolyte fluid is transported. In such a case the anode and the separator may be wholly or partly positioned against each other.

The station can for instance form part of a dispensing station for dosing an aqueous solution according to the invention, preferably a FeMTA based solution, and most preferably a FeMTA solution, as a non-caking agent, e.g., in salt, in particular sodium chloride in any grade of purity.

An exemplary embodiment of the invention will be further explained with reference to the accompanying drawing.

FIG. 1: shows schematically an electrolyte cell for use with the present invention.

During storage of a concentrated and/or diluted aqueous solution according to the present invention, viz. of an iron salt of an organic acid with a ferric component and a ferrous component of less solubility than the ferric component, preferably being concentrated and diluted aqueous solutions based on FeMTA and most preferably being the concentrated and diluted aqueous FeMTA solutions, part of the $Fe^{3+}$ content will be reduced to $Fe^{2+}$. Subsequently, the $Fe^{2+}$ will precipitate from the solution as the Fe(II) salt of the organic acid, for instance Fe(II)mesotartrate, as soon as its solubility is crossed. To reduce this risk, the aqueous solution according to the present invention (preferably the FeMTA (based) aqueous solution) is subjected to an electrolytic oxidation step carried out with one or more electrolytic cells. FIG. 1 shows an exemplary embodiment of such an electrolytic cell.

The electrolytic cell 1 comprises an anode 2 and a cathode 3. The anode 2 and the cathode 3 are separated by a non-porous ion exchange membrane 4.

A catholyte is circulated between a catholyte reservoir 5 and the catholyte space 6 between the cathode 3 and the membrane 4. In the shown example the catholyte comprises a 1-3 M HCl aqueous solution.

Similarly, an aqueous solution of non-caking agent according to the present invention (preferably being a FeMTA (based) solution) is circulated between an anolyte reservoir 7 and the anolyte space 8 between the anode 2 and the membrane 4.

An electric power supply unit 9 provides an electric potential difference between the anode 2 and the cathode 3. At the cathode 3 hydrogen ions ($H^+$) are electrochemically reduced to form hydrogen ($H_2$). Chloride ($Cl^-$) ions migrate from the catholyte space 6 via the ion exchange membrane 4 and the anolyte space 8 towards the anode 2. At the anode 2, Ferrous ($Fe^{2+}$) ions are oxidized to Ferric ($Fe^{3+}$) ions.

Oxidation of $Fe^{2+}$ to $Fe^{3+}$ reduces the $Fe^{2+}$ content and consequently stops and reverses the precipitation of the Fe(II) salt of the organic acid, for example Fe(II)mesotartrate. So solid Fe(II) salt of the organic acid, e.g. Fe(II) mesotartrate, will slowly dissolve. This way, the content of the $Fe^{3+}$ salt of the organic acid in the aqueous solution, e.g. the FeMTA content in the aqueous solution, is stabilized.

The aqueous solution according to the present invention, e.g. the FeMTA solution, can be discharged from the reservoir to be dosed to an amount of sodium chloride, if so desired, and the aqueous solution of non-caking agent, e.g. the FeMTA solution, can be replenished with a fresh supply.

The present invention is further illustrated by the following examples.

EXAMPLE 1

An electrochemical reactor was constructed in the form of a glass beaker with two graphite anode rods (diameter 10 mm×50 mm high) vertically positioned and a 20 mm diameter glass tube with a glass frit in the bottom and containing platinum cathode wire gauze. An Ag/AgCl/saturated KCl reference electrode was positioned in the anode compartment near one of the graphite anodes. An aqueous solution based on FeMTA produced according to Example 4a of WO 2010/139587 with 15 hours of boiling was filtered prior to electrolysis to remove any precipitated Fe(II)mesotartrate. The electrochemical reactor was filled with an amount of the FeMTA solution. The level of the catholyte compartment was maintained lower than the level in the anolyte compartment by means of pumping out catholyte in order to create a net flow of FeMTA solution from the anolyte compartment via the glass frit into the catholyte compartment. The anode and cathode were connected to a DC power supply and an electric potential was applied between the anode and the cathode in such a way that the measured potential between anode and reference electrode was between +0.85 and +0.97 volts. The Fe(II) content of the solution was measured in samples taken during electrolysis and the results are shown in the table. The treated anolyte remained clear after more than one week, indicating that the FeMTA is stabilized by the electrochemical treatment.

| Time [min] | Anode Potential [volts] | Fe(II) content [wt % of total iron] |
|---|---|---|
| 0 | Not measured | 1.74 |
| 110 | 0.85 | 1.38 |
| 220 | Not measured | 0.96 |
| 330 | 0.953 | 0.61 |
| 480 | 0.973 | 0.39 |

EXAMPLE 2

An aqueous solution based on FeMTA was produced as described in Example 1. The pH of the solution was set at 4.35. It was used for metering onto an amount of salt using a dosing unit as described in EP2012/074188. After a while, greyish solids precipitated in the concentrated FeMTA buffer tank. A sample of these solids (Sample A) was analyzed with X-ray Diffraction (XRD) and Inductively Coupled Plasma Emission Spectrometry (ICP-ES) and chromatography.

More particularly, XRD investigations were performed in order to study the presence of crystalline phase(s) and to determine their chemical and structural composition. The diffractogram has been recorded on a Bruker D8 diffractometer, using a standard sample holder.

Settings: Cu Kα irradiation, 2θ range: 5-75°, 0.02° steps, 16.5 sec integration time per step, a variable divergence slit of 20 mm and a detector slit of 0.6 mm. A graphite monochromator was used to suppress fluoresce, a lower background signal thus being obtained.

The diffractogram was analyzed using the Topas software package from Bruker. A quantitative assignment of the crystalline phase(s) observed was made by Rietveld refinement using reference diffractograms taken from the ICDD, ICSD and/or COD database (ICDD, International Centre for Diffraction Data, Powder Diffraction file, Full File 2007, ICSD, International Crystal Structure Database, http://www.fiz-karlsruhe.de/icsd.html, COD, Crystallography Open Database, http://www.crystallography.net/).

The crystalline phase(s) of the sample could be identified with one single compound fitting all the measured diffraction positions. This structure was adopted from a similar Cobalt complex (COD-2204721). See also Dai-Xi Li, Duan-Jun Xu and Yuan-Zhi Xu, Acta Crystallographica, Section E 60(12) (2004) 1982-1984). Because iron and cobalt are adjacent in the periodic table, are both divalent, and have a comparable atomic radius (156 and 150, respectively), the element replacement is justified.

The diffractogram of the sample is given in FIG. 2, together with the model fit. The diffractogram of the model fitted the measured data very well, only slight discrepancies in measured and modelled intensity could be observed, which were caused by the measurement method which used a model to describe the beam and diffractometer geometry. The difference of the fit from the measured data is shown below the curves in grey.

The bruto formula of the complex was $\{[Fe(C4H4O6)(H2O)2](H2O)n\}m$.

A representation of the structure is given in FIG. 3. The compound is an iron polymeric complex, where an iron atom is coordinated by two tartrate dianions and two water molecules in an octahedral geometry. The hydroxyl oxygen atom and one oxygen atom of each carboxyl group chelate to the iron atom, but the other oxygen atom of this carboxyl group is uncoordinated. The polymeric chains are linked to each other via hydrogen bonds to form cavities, which are filled with solvent water molecules.

Inductively Coupled Plasma Emission Spectrometry (ICP-ES) experiments were performed by digesting a sample of the solids by a closed vessel micro-wave destruction using nitric acid. The element concentrations were measured by radial viewed ICP-ES (Spectro Arcos NT). Scandium was used as internal standard.

The results are reported in Tables 1 and 2.

TABLE 1

Main element concentrations as determined by ICP-ES.

| Element (% m/m) | Solids from Sample A |
|---|---|
| Fe | 21-22 |
| Mn | 0.39-0.41 |

TABLE 2

Minor and trace element concentrations as determined by ICP-ES.

| Element (mg/kg) | Sample A | LOD* (mg/kg) |
|---|---|---|
| Al | 8.8-11 | 1 |
| As | <10 | 10 |
| B | <2 | 2 |
| Ba | 3.2-3.9 | 0.1 |
| Be | <0.05 | 0.05 |
| Ca | 140-140 | 1 |
| Cd | <0.2 | 0.2 |
| Co | 32-32 | 1 |
| Cr | 3-3 | 1 |
| Cu | 64-67 | 1 |
| Fe | see Table 1 | 1 |
| K | <10 | 10 |
| Li | <0.5 | 0.5 |
| Mg | 330-340 | 0.1 |
| Mn | see Table 1 | 0.5 |
| Mo | <5 | 5 |
| Na | 790-810 | 10 |
| Ni | 16-17 | 2 |
| P | 41-43 | 5 |
| Pb | <10 | 10 |
| S | 62-64 | 5 |
| Sb | <10 | 10 |
| Se | <20 | 20 |
| Si | 30-37 | 5 |
| Sn | <10 | 10 |
| Sr | 0.1-0.2 | 0.1 |
| Ti | 12-13 | 0.5 |
| V | <2 | 2 |
| Zn | 42-44 | 1 |
| Zr | <2 | 2 |

*LOD is level of detection

Sample A was also analyzed via chromatography using as column a stainless steel tube, length 300 mm, internal diameter 7.8 mm, IOA 1000 Organic Acids, as supplied by Alltech (No. 9646), and as mobile phase sulfuric acid, c(H2SO4)=0.01 mol/l.

The results of the determination of meso-D,L-TA, and impurities are shown in Table 3.

TABLE 3

Results of the determination of TA and impurities in solid sample from mTA dosing

| Meso-TA (0 aq) (wt %) | D, L-TA (wt %) | Oxalic acid (0 aq) (wt %) | Di-hydroxy malonic acid' (wt %) | Mono-hydroxy malonic acid (wt %) | Acetic acid (wt %) |
|---|---|---|---|---|---|
| Sample A 54.9 | n.d. | 0.1 | <0.1 | 0.1 | <0.1 |

Remark: n.d. = not detectable;

Conclusions:

The bruto formula of the complex is $\{[Fe(C4H4O6)(H2O)2](H2O)n\}m$. The compound is an iron polymeric complex, where an iron atom is coordinated by two tartrate dianions and two water molecules in an octahedral geometry. The iron is in the 2+ state. The solids consist for 54.9 wt % of tartrate in the meso-form (the remainder being iron, water, and some minor impurities). Tartrates in the D or L form were not detected. Side products were also not detected. Sample A contained a large amount of iron (22 wt %) and a small amount of manganese (0.4 wt %). Some trace metals like calcium and magnesium were detected.

EXAMPLE 3

An aqueous solution based on FeMTA was produced as described in Examples 1 and 2. The original pH 3.8 of this solution was decreased to 3.5 by the addition of 1M HCl and subsequently further in steps of 0.5 pH unit to ultimately pH 1. For comparative reasons a diluted (0.7 wt % Fe) aqueous solution of $FeCl_3$ was subjected to stepwise pH increase by addition of a diluted NaOH aqueous solution. At all these various pH values the free $Fe^{3+}$ concentration was measured using an EG&G Instruments potentiostat/galvanostat model 263A.

As shown in FIG. 4, at a pH higher than 2.5, precipitation of $Fe(OH)_3$ is observed. In the presence of meso-tartaric acid, at a pH above 2.5, $Fe^{3+}$ remains in solution as it forms a complex with the meso-tartaric acid. If the pH increases over 4.5, however, this complex starts to break down and $Fe^{3+}$ starts to precipitate from the solution as $Fe(OH)_3$.

In FIG. 4, the influence of the pH on the free Fe(III) concentration is shown, wherein -♦- is used for the aqueous solution based on FeMTA -■- is used for the aqueous $FeCl_3$ solution

EXAMPLE 4 AND COMPARATIVE EXAMPLES A-E

Samples:
Sodium Chloride: Sanal P
  For Example 4: The additive is a FeMTA based solution (comprising 43.3 g of $H_2O$, 2.12 g of $FeCl_3$, 0.43 g of racemic tartaric acid, 0.9 g of meso-tartaric acid.$H_2O$, and 3.28 g of sodium hydroxide). The mTA:Fe ratio is 1:1.
  For Comparative Examples A-E: The composition of additive solutions A-E can be found in Table 4. These are compositions according to EP 0 517 234.
The dosing conditions can also be found in Table 4.

Equipment
Powder Flow Analyzer/Rheometer, Type TA-XT2i, from Stable Micro Systems.

The cakeability was determined by continuously measuring the force and torque imposed on the powder by a moving blade. When the force is plotted against the travelling depth in the sample, the integral underneath the curve equals the amount of consumed energy (CE).

Procedure
Salt was Distributed in Representative Portions.
The following pretreatment was applied to determine the degree of caking.
  A plastic bag of suitable size was charged with 49±0.1 g of salt.
  Additive solutions A, B, C, D, E and FeMTA solution and demineralized water were added to the salt samples, resulting in a water content of 2 wt % for each salt sample.
  Salt and liquid were mixed by hand in a closed plastic bag for about 2 minutes, until a visually homogeneous mixture was obtained.
  The resulting mixture was filled into the aeration cylinder.
  The sample was consolidated by applying a 1 kg weight using the rheometer.
  The sample was dried with compressed air, which was introduced through the bottom of the cylinder (1.5 l/min) for at least 12 hours.
After drying, the force to break the cake with the helical blade was measured over a distinct range of bed height (7-19 mm). From this the $CE_4$ value was calculated, which corresponds to the caking energy in mJ measured over a range of 4 mm bed height.

The settings of the rheometer are displayed in Table 5.1 and Table 5.2.

TABLE 4 composition of additive solutions A-E and concentrations for the addition to sodium chloride ("salt"):

| | Composition (g) | | | | |
|---|---|---|---|---|---|
| | Comp. Ex. A | Comp. Ex. B | Comp. Ex. C | Comp. Ex. D | Comp. Ex. E |
| $Fe(II)SO_4 \cdot 7H_2O$ | 0.75 | 1.5 | 0.1 | 2.0 | 0.76 |
| $H_2SO_4$ | 1.27 | 0.98 | 0.48 | 2.88 | 0 |
| $HNO_3$ | 0.1 | 0.1 | 0.1 | 0.1 | 0.1 |
| $H_2O$ | 97.88 | 97.4 | 99.32 | 95.01 | 99.14 |
| DL tartaric acid | 0.2 | 0.19 | 0.2 | 0.2 | 0.2 |
| Total | 100.20 | 100.18 | 100.20 | 100.19 | 100.20 |
| pH | 0.79 | 0.90 | 1.09 | 0.49 | 1.94 |
| Addition to sodium chloride (49 g) | | | | | |
| Sample (μl) | 100 | 50 | 748 | 37 | 98 |
| $H_2O$ (μl) | 900 | 950 | 252 | 963 | 902 |

In Example 4: Dosing 25 μl of FeMTA solution per 49 g of sodium chloride, and 975 μl of water per 49 g of sodium chloride.

TABLE 5.1

Rheometer settings for sample pretreatment

| Target | Value | Tip speed | Angle |
|---|---|---|---|
| Position | 85 | 10 | 90 |
| Force | 1000 | 10 | 178 |
| Position | 80 | 10 | 2 |
| Position | 130 | 10 | 90 |

TABLE 5.2

Rheometer settings for the determination of the cakeability

| Target | Value | Tip speed | Angle |
|---|---|---|---|
| Position | 55 | 10 | 90 |
| Position | 30 | 5 | 175 |
| Position | 100 | 14 | 45 |
| Shake | 15 | 0 | 0 |
| Position | 130 | 10 | 90 |

Results

The caking energy of the samples was measured in fourfold.

The results are summarized in Table 6.

TABLE 6

Caking energy of measured samples:

$CE_4$ (N · mm)

| Test | Blank | Additive sol. according to Ex. 4 | Additive solution A | Additive solution B | Additive solution C | Additive solution D | Additive solution E |
|---|---|---|---|---|---|---|---|
| 1 | 45 | 9 | 53 | 54 | 38 | 54 | 39 |
| 2 | 34 | 10 | 41 | 64 | 82 | 37 | 32 |
| 3 | 33 | 8 | 66 | 45 | 58 | 50 | 23 |
| 4 | 35 | 7 | 29 | 56 | 40 | 52 | 26 |
| average | 37 | 9 | 47 | 55 | 54 | 48 | 30 |

It has been proven that the degree of caking of sodium chloride treated with additive solutions A-E is equal to or significantly higher than the degree of caking of sodium chloride as such. The degree of caking of sodium chloride treated with additives A-E is significantly higher than the degree of caking of sodium chloride treated with the additive solution of Example 4, viz. the FeMTA based solution.

The invention claimed is:

1. A process for stabilizing an aqueous solution comprising an iron complex of an organic acid with a ferric component and a ferrous component of less solubility than the ferric component, the process comprising at least partly subjecting the aqueous solution to electrolytic oxidation, wherein the aqueous solution has a pH between 3 and 5.

2. The process according to claim 1, wherein the aqueous solution comprises an $Fe^{3+}$ complex of meso-tartaric acid.

3. The process according to claim 2, wherein the electrolytic oxidation is carried out in at least one electrolytic cell, with a separated anode and cathode.

4. The process according to claim 3, wherein the aqueous solution comprises FeMTA and is circulated along the anode of one or more of the at least one electrolytic cells.

5. The process according to claim 3, wherein the anode and cathode are separated by a porous or a non-porous separator.

6. The process according to claim 5, wherein the anode and cathode are separated by a non-porous separator comprising at least one of an anion exchange membrane or a cationic exchange membrane.

7. The process according to claim 6, wherein the aqueous solution comprises FeMTA and is circulated along the anode of one or more of the at least one electrolytic cells.

8. The process according to claim 6, wherein the aqueous solution comprises FeMTA and has an iron content below 5 wt. % by weight of the total solution, and wherein the electrolytic oxidation is carried out to maintain the $Fe^{2+}$ content below 3 wt. % by weight of the total iron content.

9. The process according to claim 6, wherein the electrolytic cell comprises a catholyte of 1-3 M HCl aqueous solution.

10. The process according to claim 9, wherein the aqueous solution comprises FeMTA and is circulated along the anode of one or more of the at least one electrolytic cells.

11. The process according to claim 1, wherein the aqueous solution comprises FeMTA and has an iron content below 5 wt. % by weight of the total solution, and wherein the electrolytic oxidation is carried out to maintain the $Fe^{2+}$ content below 3 wt. % by weight of the total iron content.

12. The process according to claim 1, wherein at least 50 wt. % of the $Fe^{2+}$ in the aqueous solution is oxidized to $Fe^{3+}$.

13. The process according to claim 1, wherein at least 90 wt. % of the $Fe^{2+}$ in the aqueous solution is oxidized to $Fe^{3+}$.

14. A station for preparing an aqueous solution, wherein the station comprises at least one electrolytic cell comprising the aqueous solution for the oxidation of $Fe^{2+}$, and wherein the solution comprises an iron complex of an organic acid with a ferric component and a ferrous component of less solubility than the ferric component, and the aqueous solution has pH between 3 and 5.

15. The station according to claim 14, wherein the at least one electrolytic cell comprises an anode, a cathode, and a separator separating the anode from the cathode.

16. The station according to claim 15, wherein the separator is a non-porous anionic or cationic exchange membrane.

17. The station according to claim 16, wherein the anode comprises a porous structure forming part of a circulation loop, and wherein the anode is at least partly positioned against the separator.

18. The station according to claim 16, wherein an anolyte space between the anode and the separator is part of a circulation loop.

19. The station according to claim 18, wherein the anode comprises a porous structure forming part of a circulation loop, and wherein the anode is at least partly positioned against the separator.

20. A dispensing station for dosing an aqueous solution of an iron complex of an organic acid with a ferric component on salt, wherein the dispensing station for dosing comprises at least one electrolytic cell comprising a aqueous solution for the oxidation of $Fe^{2+}$, and wherein the solution comprises an iron complex of an organic acid with a ferric component and a ferrous component of less solubility than the ferric component, and the aqueous solution has a pH between 3 and 5.

* * * * *